(12) United States Patent
Kim et al.

(10) Patent No.: US 9,245,031 B2
(45) Date of Patent: *Jan. 26, 2016

(54) USING SMART PUSH TO RETRIEVE SEARCH RESULTS BASED ON A SET PERIOD OF TIME AND A SET KEYWORD WHEN THE SET KEYWORD FALLS WITHIN TOP POPULAR SEARCH RANKING DURING THE SET TIME PERIOD

(71) Applicant: Samsung Electronics Co., Ltd., Gyeonggi-do (KR)

(72) Inventors: Min-Ji Kim, Seoul (KR); Jin Park, Gyeonggi-do (KR); Yong-Soo Jeong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/509,324

(22) Filed: Oct. 8, 2014

(65) Prior Publication Data
US 2015/0026150 A1    Jan. 22, 2015

Related U.S. Application Data

(63) Continuation of application No. 13/648,451, filed on Oct. 10, 2012, now Pat. No. 8,886,640.

(30) Foreign Application Priority Data

Oct. 10, 2011 (KR) ........................ 10-2011-0103233

(51) Int. Cl.
*G06F 7/00* (2006.01)
*G06F 17/30* (2006.01)
*H04L 29/08* (2006.01)

(52) U.S. Cl.
CPC .... *G06F 17/30864* (2013.01); *G06F 17/30699* (2013.01); *G06F 17/30867* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 2008/0255935 A1* | 10/2008 | Madhavan | G06Q 30/02 705/14.64 |
| 2010/0114954 A1* | 5/2010 | Sareen | G06F 17/30864 707/776 |
| 2011/0010362 A1 | 1/2011 | Kim | |
| 2011/0131242 A1 | 6/2011 | Bent et al. | |
| 2011/0179017 A1 | 7/2011 | Meyers et al. | |

OTHER PUBLICATIONS

Denning, "The Profession of IT, Infoglut", Communications of the ACM Jul. 2006, vol. 49, No. 7, pp. 15-19.
Shahsarari et al., "Smart Push Model in Distributed Network Monitoring", Proceedings IEEE SoutheastCon 2002, pp. 93-98.

* cited by examiner

*Primary Examiner* — Uyen Le
(74) *Attorney, Agent, or Firm* — Cha & Reiter, LLC.

(57) ABSTRACT

A search method in a portable terminal using a keyword is disclosed. A portable terminal transmits, to a server, setting information for a smart push in which a keyword and a search term are set. The server determines whether the keyword falls within top popular search rankings during a term period corresponding to the search term based on the received smart push setting information. If the keyword falls within the top popular search rankings, the server transmits search results obtained using the keyword to the portable terminal.

20 Claims, 3 Drawing Sheets

USING SMART PUSH TO RETRIEVE SEARCH RESULTS BASED ON A SET PERIOD OF TIME AND A SET KEYWORD WHEN THE SET KEYWORD FALLS WITHIN TOP POPULAR SEARCH RANKING DURING THE SET TIME PERIOD

CROSS REFERENCE TO RELATED APPLICATIONS

This application is a Continuation of U.S. patent application Ser. No. 13/648,451 filed on Oct. 10, 2012, now U.S. Pat. No. 8,886,640, which claims the benefit under 35 U.S.C. §119(a) of a Korean Patent Application filed in the Korean Intellectual Property Office on Oct. 10, 2011 and assigned Serial No. 10-2011-0103233, the entire disclosure of which is hereby incorporated by reference.

BACKGROUND

1. Field of the Invention

The present invention relates generally to searching for information by entering keywords, and more particularly, to a method and system capable of searching for information that can be available later in time via keywords.

2. Description of the Related Art

With a help of widespread usage of portable terminals, such as smart phones, users may now search desired information anywhere at any time by entering search keywords. For example, a user may perform a search for necessary information by accessing a portal site(s) and entering keywords in a search window on his or her portable terminal.

However, for information that is not available at the present time but can be known later, the user is unable to search the information. For example, if one wishes to find out a passage of an exam, an acceptance of a job or a school at a later time, the user must inconveniently perform a subsequent search in a repeated manner.

Accordingly, there is a need for method and system that allows users to conveniently get the desired information that can be known only later or in the future without continuously performing a number of subsequent searches.

SUMMARY

An aspect of an exemplary embodiment of the present invention is to provide a method and system capable of providing desired information to a user that is unknown or unavailable at the time of search but can be known or obtained later from a variety of sources, without the user's hassle of having to later visit and search a portal site or a specific web site.

In accordance with one aspect of the present invention, there is provided a search method which includes transmitting, by a portable terminal, setting information for a smart push in which a keyword and a search term period are set, to a server; determining by the server whether the keyword falls within top popular search rankings during a term corresponding to the search term by checking the received smart push setting information; and if the keyword falls within the top popular search rankings, transmitting search results obtained using the keyword to the portable terminal.

In accordance with another aspect of the present invention, there is provided a search system which includes a portable terminal for transmitting setting information for a smart push in which a keyword and a search term period are set, to a server; and the server for determining whether the keyword falls within top popular search rankings during a term corresponding to the search term by checking the received smart push setting information, and if the keyword falls within the top popular search rankings, transmitting search results obtained using the keyword to the portable terminal In accordance with yet another aspect of the present invention, there is provided a portable terminal in communication with a server which includes: an input unit to input at least one key word and a term period; and a controller for transmitting setting information including the at least one key word and the term period to the server, wherein upon receipt of the setting information, the server determines whether the at least one word keyword falls within top popular search rankings during a duration corresponding to the term period, and if the at least one keyword falls within the top popular search rankings during the term period, performing a search and transmitting a search result containing the at least one keyword to the terminal.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

A portable terminal, to which an embodiment of the present invention is applicable, may be any mobile electronic device that its user may easily carry with him or her, and may include video phones, cell phones, smart phones, International Mobile Telecommunication 2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-book readers, portable computers (e.g., notebook computers and tablet computers), and digital cameras.

Figure 1:
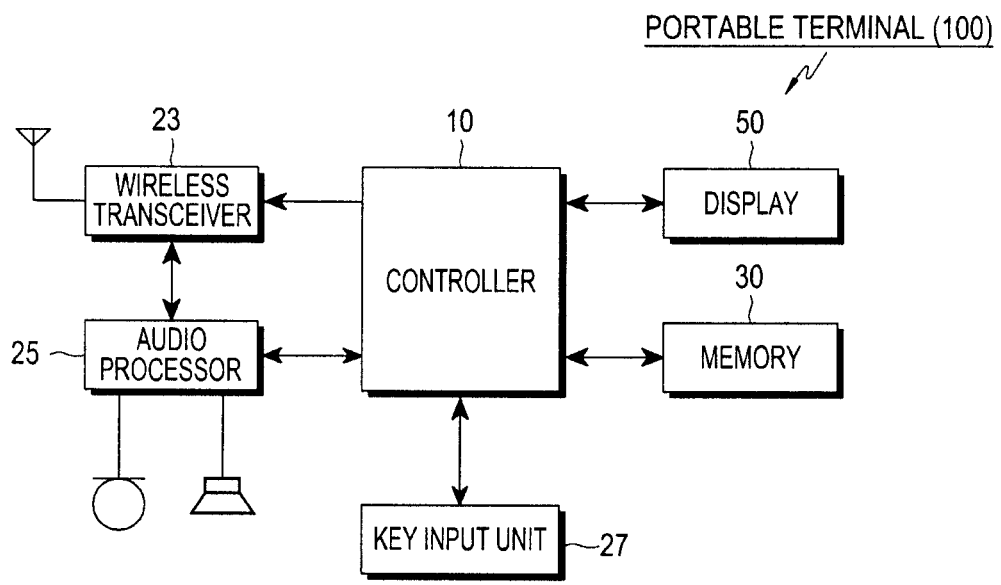
FIG. 1 is a block diagram of a portable terminal according to an embodiment of the present invention.

Referring to FIG. 1, a portable terminal 100 according to an embodiment of the present invention includes a controller 10, a wireless transceiver 23, an audio processor 25, a key input 27, a memory 30, and a display 50.

A wireless transceiver 23 includes a Radio Frequency (RF) unit and a modulator/demodulator (modem). The RF unit includes an RF transmitter for up-converting a frequency of transmission signals and amplifying the up-converted signals, and an RF receiver for low-noise-amplifying received signals and down-converting a frequency of the amplified signals. The modem includes a transmitter for coding and modulating transmission signals, and a receiver for demodulating and decoding signals received from the RF unit. In accordance with an embodiment of the present invention, the wireless transceiver 23 may enable communication with a server 200 to be described in conjunction with FIG. 2, thus making it possible for a user to set a smart push and request transmission of the smart push setting information to the server 200.

An audio processor 25 may constitute a coder/decoder (codec), which includes a data codec and an audio codec. The data codec processes data signals such as packet data, while the audio codec processes audio signals such as voice and multimedia files. The audio processor 25 converts digital audio signals received from the modem into analog audio signals by means of the audio codec, and plays the analog audio signals using a speaker SPK. The audio processor 25 converts analog audio signals picked up by a microphone MIC into digital audio signals by means of the audio codec, and transfers the digital audio signals to the modem. The codec may be provided independently, or may be included in a controller 10. In accordance with an embodiment of the present invention, if the user sets the smart push, the audio processor 25 may output a predetermined sound effect for a process of setting the smart push.

A key input unit 27 may include alphanumeric keys needed to input alphanumeric information and function keys needed to set various functions, or may include a touchpad or the like. When a display 50 has a capacitive or resistive touch screen, the key input unit 27 may include a minimum number of predetermined keys, and the display 50 may replace part of the key input function of the key input unit 27. In accordance with an embodiment of the present invention, using the key input unit 27, the user may enter smart push setting information by entering keywords and secondary keywords and entering desired terms and sources for the smart push.

A memory 30 may include a program memory and a data memory. The program memory stores programs for controlling the overall operation of the portable terminal. The memory 30 may further include external memories such as Compact Flash (CF), Secure Digital (SD), Micro Secure Digital (Micro-SD), Mini Secure Digital (Mini-SD), Extreme Digital (xD), and Memory Stick. The memory 30 may also include a disk such as Hard Disk Drive (HDD) and Solid State Disk (SSD). In accordance with an embodiment of the present invention, the memory 30 may store (or temporarily store) setting information for the smart push set by the user.

The display 50 may include Liquid Crystal Display (LCD) or Organic Light Emitting Diodes (OLED), which is classified into Passive Matrix OLED (PMOLED) and Active Matrix OLED (AMOLED), and may output various display information generated in the portable terminal. When including a capacitive or resistive touch screen, the display 50 may serve as an input unit for controlling the portable terminal, along with the key input unit 27. In accordance with an embodiment of the present invention, the display 50 may display a setting window where the smart push may be set, allowing the user to set the smart push while visually checking it. The display 50 may display the smart push data (e.g., search results) received from the server 200.

The controller 10 controls the overall operation of the portable terminal according to an embodiment of the present invention, and may switch and control an operation of the portable terminal depending on a user input received using the key input unit 27 and/or the display 50. In accordance with an embodiment of the present invention, if a smart push is set by the user, the controller 10 transmits smart push setting information to the server 200, receives the search results that have passed the conformance test, from the server 200, and provides the received search results to the user. The detailed operation of the controller 10 will be described below.

Although the components that may be included in the portable terminal, such as a Global Positioning System (GPS) module, a short-range communication module (e.g., Wi-Fi module), an acceleration sensor, a proximity sensor, a geomagnetic sensor, a Digital Media Broadcasting (DMB) receiver, and a camera module, are not shown in the block diagram of FIG. 1, it will be understood by those of ordinary skill in the art that these un-depicted components may be included in the portable terminal to provide their own unique functions.

For example, a specific gesture input of the user may be recognized with an individual or collaborative use of an acceleration sensor for measuring a dynamic force of the portable terminal, such as acceleration, vibration and shock, and a gyroscope for detecting a dynamic motion of the portable terminal. If a specific gesture input is recognized, a smart push setting window may be displayed and the user may set a smart push (e.g., may enter keywords and secondary keywords, and set terms and sources for the search) on the setting window. In addition, the portable terminal 100 may communicate with the server 200, using a short-range communication module instead of the wireless transceiver 23.

Figure 2:
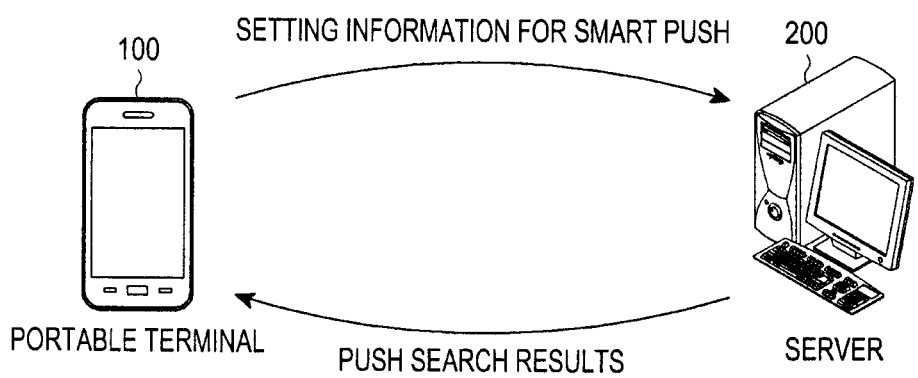
FIG. 2 illustrates a portable terminal and a server according to an embodiment of the present invention.

FIG. 2 illustrates a portable terminal and a server according to an embodiment of the present invention.

Referring to FIG. 2, the portable terminal 100 accesses the server 200 and transmits setting information for a smart push set by a user to the server 200, and in turn the server 200 performs a search based on the parameters set in the smart push setting information and then transmits (or pushes) the search results to the portable terminal 100.

Although the server 200 is assumed as a server (e.g., portal server) of a portal site that provides information search services, the server 200 is not limited thereto. The server 200 may provide the information (e.g., link information about particular web pages) that is searched for with the keywords (i.e., search keywords) entered by the user using a search engine.

Most portal sites typically provide popular search rankings about specific search keywords based on past search frequency and pattern made by a general public in the Internet. Thus, the sever 200 may create and manage, as a list of popular search rankings, a list of keywords which are most frequently selected for a specific period of time, by checking and storing the number of user entries for keywords (e.g., search keywords), the entry times, etc. For example, the server 200 may create and manage a list of popular search rankings using the top 20 popular keywords, searches based on which have rapidly increased for a specific period of time, compared to the usual.

Figure 3:
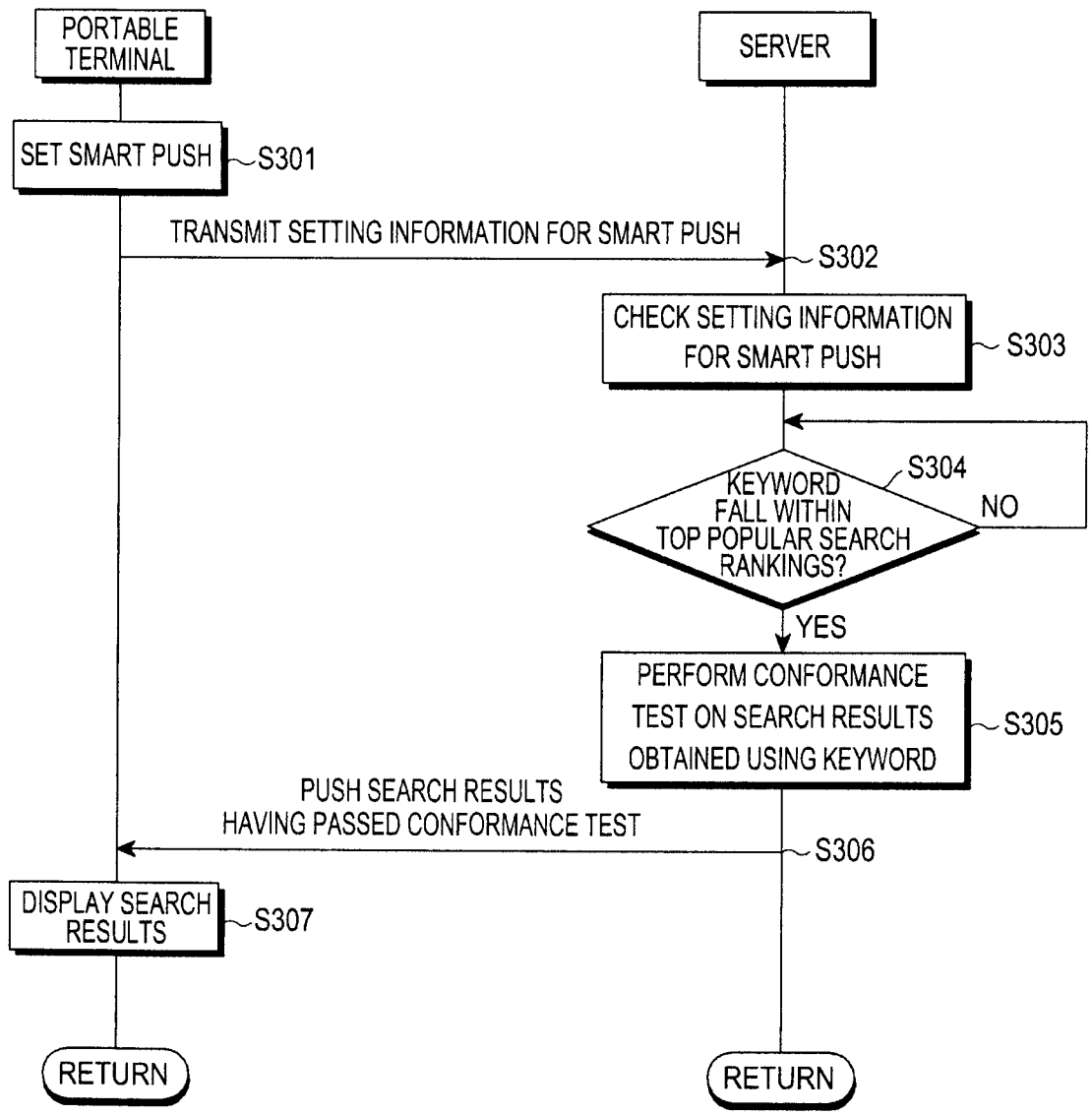
FIG. 3 is a flowchart illustrating a process of searching for information with a smart push according to an embodiment of the present invention.

FIG. 3 is a flowchart illustrating a process of searching for information with a smart push according to an embodiment of the present invention, and FIGS. 4A to 4D illustrate a process of searching for information with a smart push according to an embodiment of the present invention. An embodiment of the present invention for searching for information with a smart push will be described below with reference to FIGS. 1 to 4D.

Referring to FIG. 3, in steps S301 and S302, after a smart push has been set by the user, the controller 10 of the portable terminal 100 transmits the smart push setting information to the server 200.

Figure 4A:
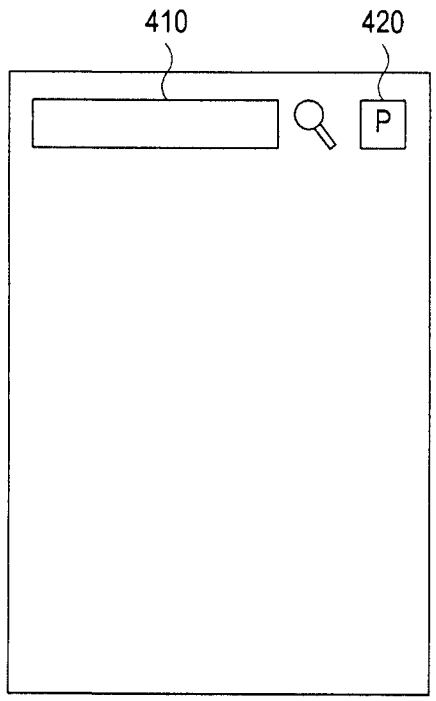
FIG. 4A, FIG. 4B, FIG. 4C and FIG. 4D illustrate a process of searching for information with a smart push according to an embodiment of the present invention.

As shown in FIG. 4A, a user may search for information corresponding to search keywords by entering search keywords in a search window 410. In addition to these conventional search methods, the present invention additionally provides a smart push option 420. If the user activates the smart push by pushing the icon 420, the controller 10 displays a setting window for the smart push as shown in FIG. 4B.

Figure 4B:
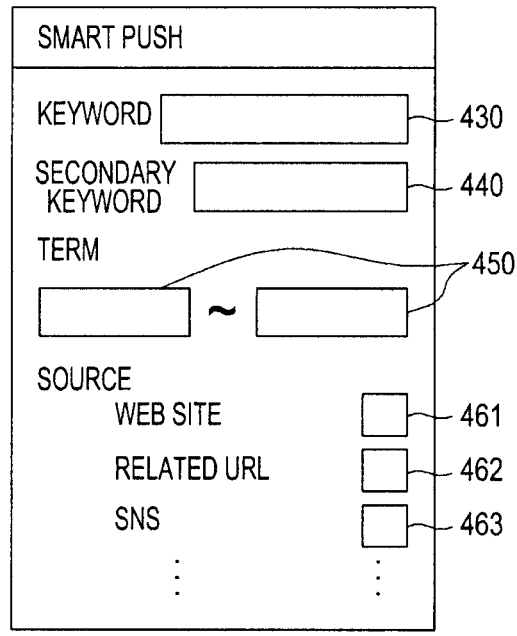

Referring to FIG. 4B, a keyword 430 represents search keywords, and a secondary keyword 440 represents keywords used to filter (or perform the conformance test according to an embodiment of the present invention) the search results obtained using the keyword 430. A term 450 represents the term in which it is determined whether the keyword 430 falls within top popular search rankings, and sources 461 to 463 are used to filter the search results obtained using the keyword 430 depending on the sources of the search results.

Figure 4C:
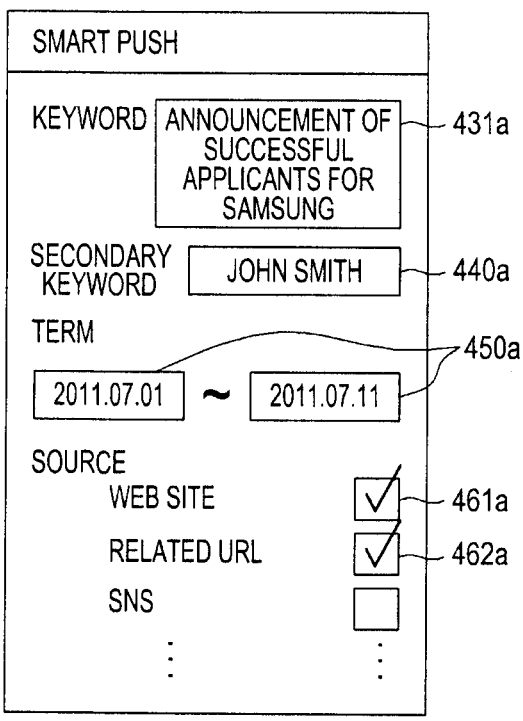

For example, a user may set (or enter) keywords, secondary keywords, terms, sources, etc. on a smart push setting screen shown in FIG. 4C, using keys on the key input unit 27 or a touch screen-based virtual keyboard on the display 50.

Referring to FIG. 4C, the user may enter a keyword 431a of "Announcement of Successful Applicants for Samsung" in the keyword window 430, enter a secondary keyword 440a of "John Smith" corresponding to his or her name (or other's name) in the secondary keyword window 440, set a term 450a of "Jul. 1, 2011 to Jul. 11, 2011" in the term window 450, and selectively choose "Web Site" 461a and "Related Uniform Resource Locator (URL)" 462a from among the sources.

Selecting the web site 461a means a user desires, if available, to receive information about the web site (e.g., a web site announcing successful applicants for Samsung) that directly provides successful applicants information associated with the keyword 431a among the search results obtained using the keyword 431a.

Selecting the related URL 462a means a user desires, if available, to receive information (e.g., link information) about the URL of the news associated with the keyword 431a or the URL(s) of the web page most frequently selected by others, among the search results obtained using the keyword 431a.

Selecting Social Network Service (SNS) 463a in the SNS window 463 means a user desires, if available, to receive information (e.g., posted content) about the writings, which are posted on Facebook™, Twitter™, etc. in conjunction with the keyword 431a, among the search results obtained using the keyword 431a.

Assuming that it is uncertain on which date between Jul. 1, 2011 to Jul. 11, 2011 that the successful applicants for Samsung will be announced, the smart push can be set on the date of Jun. 6, 2011 or any range of dates that may be announced or become available.

In accordance with an embodiment of the present invention, however, if the user completes the setting of the smart push without entering the secondary keyword 440a of "John Smith" in the secondary keyword window 440 on the smart push setting screen shown in FIG. 4C, the user may request the portable terminal 100 in advance to receive, from the server 200, information about only the web site 461a and the related URL 462a among the search results obtained using the keyword 431a when the inquired information becomes available between Jul. 1, 2011 to Jul. 11, 2011 (e.g., when the keyword "Announcement of Successful Applicants for Samsung" or its similar keywords fall within the top popular search rankings). Alternatively, the user may request a number of sites providing the requested information to provide the search result when the information is available during the defined date range on the smart push setting screen.

In contrast, if the user completes the setting of the smart push after entering the secondary keyword 440a of "John Smith" in the secondary keyword window 440 on the smart push setting screen shown in FIG. 4C, the user may request the portable terminal 100 in advance to receive, from the server 200, only the search results including text information of "John Smith" from the web site 461a and the related URL 462a, which is obtained among the search results obtained using the keyword 431a when such requested information meeting the criteria set in the smart push setting screen becomes available.

If the setting for the smart push is completed, the controller 10 stores the smart push setting information in the memory 30 and then transmits it to the server 200 using the wireless transceiver 23 or the short-range communication module (not shown).

Referring back to FIG. 3, in steps S303 and S304, the server 200 checks the received smart push setting information and determines whether the keywords included in the setting information fall within the top popular search rankings.

Upon receiving the smart push setting information from the portable terminal 100, the server 200 checks keywords, secondary keywords, terms, sources, etc. included in the received setting information. Thereafter, the server 200 determines whether the keywords (including their similar keywords) included in the smart push setting information fall within the top popular search rankings of any search sites (e.g., Google™, Yahoo™, etc.) or designated sites.

For example, if the keyword and the term entered by the user are "Announcement of Successful Applicants for Samsung" and "Jul. 1, 2011 to Jul. 11, 2011" shown in their associated windows 431a and 450a, respectively, the server 200 determines whether the keyword of "Announcement of Successful Applicants for Samsung" and its similar keywords (e.g., "Announcement of Successful Applicants for Samsung Electronics", "Job Openings for Samsung", "Successful Applicants for Samsung", and "Announcement by Samsung", etc) fall within the top popular search rankings (e.g., top 20 popular search rankings) in the portal sites from Jul. 1, 2011 to Jul. 11, 2011.

In steps S305 to S307, if it is determined that the keywords included in the smart push setting information fall within the top popular search rankings, the server 200 makes a search using the keywords, performs the conformance test on the search results, and pushes (or transmits) the search results that have passed the conformance test, to the portable terminal 100, and the portable terminal 100 displays the received search results. Note that the server 200 performs the conformance test (e.g., filtering) on the search results by checking the secondary keyword and the term included in the smart push setting information.

If it is determined in step S304 that the keywords included in the smart push setting information fall within the top popular search rankings, the server 200 makes a search using the keywords included in the smart push setting information and analyzes the search results.

The search results may include information about a large number of links, such as link information of the web site that directly provides information about the keywords included in the smart push setting information, and/or link information of the web page that other people have selected the most frequently after their search.

In accordance with an embodiment of the present invention, the user may be provided with a function of filtering the search results by entering secondary keywords and setting the desired sources from which to receive the requested information. Therefore, the server 200 performs the conformance test (e.g., filtering) on the search results by checking the secondary keyword and the term included in the smart push setting information.

Figure 4D:
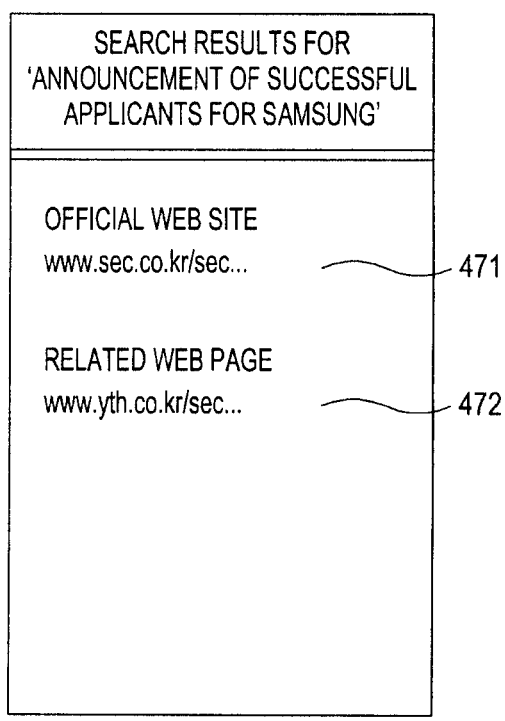

In the embodiment, if the received smart push setting information is analyzed such that no secondary keyword is entered and as regards to the sources, the web site 461*a* and the related URL 462*a* may be selected as a default, the server 200 acquires only the search results whose sources correspond to the web site 461*a* and the related URL 462*a*, from among the numerous search results for the keyword 431*a* of "Announcement of Successful Applicants for Samsung", and transmits the acquired search results to the portable terminal 100. Accordingly, the controller 10 of the portable terminal 100 may display the search results received from the server 200 as a web site 471 and a related URL (i.e., related web page) 472 as shown in FIG. 4D.

In an alternate embodiment, if it is determined that the secondary keyword 440*a* of "John Smith" is entered and the web site 461*a* and the related URL 462*a* are selected as desired sources, the server 200 may transmit the search results to the portable terminal 100 only when a text of "John Smith" is detected from among the search results and from with the web site 461*a* and the related URL 462*a* containing the keyword 431*a* of "Announcement of Successful Applicants for Samsung" or other words containing the keyword 431*a*. Accordingly, the user of the portable terminal 100 may receive the search information only regards to the announcement of the successful applicants for Samsung having a list of successful applicants containing the name, "John Smith".

It should be noted that the smart push setting information shown in FIG. 4 is for illustrative purposes, thus other combination of setting information can be set according to the teachings of the present invention. Therefore, the setting information in the drawing should not impose limitations on the scope of the invention.

As is apparent from the foregoing description, the present invention allows a user to conveniently get his or her desired information without the hassle of having to revisit and research a particular portal site or a specific web site in order to check the information that is not currently available, by setting the smart push setting information as described above.

It should be further noted that the above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
   a wireless transceiver to establish a connection with an electronic device external to the apparatus; and
   a controller configured to:
   transmit, via the wireless transceiver, a keyword and a specified period to the electronic device, the keyword and the specified period to be used for a push service of the electronic device;
   receive information associated with the keyword from the electronic device, when the keyword satisfies a specified condition during the specified period; and
   provide the information to a user of the apparatus.

2. The apparatus of claim 1, wherein the controller is configured to receive the information when the keyword falls within a specified popular search ranking range.

3. The apparatus of claim 1, wherein the information comprises a search result obtained at the electronic device based at least in part on the keyword.

4. The apparatus of claim 1, wherein the information comprises a web page selected by one or more devices external to the apparatus and the electronic device.

5. The apparatus of claim 1, wherein the electronic device comprises one or more servers including a search engine.

6. The apparatus of claim 1, wherein the controller is configured to:
   obtain at least one of the keyword or the specified period from an user.

7. The apparatus of claim 1, wherein the controller is configured to:
   transmit source information to the electronic device, the source information specifying at least one source of the information.

8. The apparatus of claim 7, wherein the source information comprises at least one of a uniform resource locator, a web site, or a social network service.

9. The apparatus of claim 1, wherein the controller is configured to:
   transmit another keyword to the electronic device such that a search result obtained based on the keyword can be filtered based on the other keyword by the electronic device.

10. The apparatus of claim 1, wherein the controller is configured to receive the information based on an information transmission initiated by the electronic device.

11. An apparatus comprising:
    a wireless transceiver to establish a connection with an electronic device external to the apparatus; and
    a controller configured to:
    receiving a keyword and a specified period from the electronic device, the keyword and the specified period to be used for a push service of the apparatus;
    determine whether the keyword satisfies a specified condition during the specified period; and
    transmit information associated with the keyword to the electronic device based on the determining outcome.

12. The apparatus of claim 11, wherein the apparatus comprises a search engine.

13. The apparatus of claim 11, wherein the controller is configured to:
   determine that the keyword satisfies the specified condition when the keyword corresponds to one of a list of keywords searched by one or more other electronic devices during the specified period.

14. The apparatus of claim 11, wherein the controller is configured to:
   obtain at least a portion of the information based on the keyword.

15. The apparatus of claim 11, wherein the controller is configured to:
   identify one or more sources based on source information received from the electronic device; and
   obtain at least a portion of the information from the one or more sources.

16. The apparatus of claim 11, wherein the controller is configured to:
   identify another keyword received from the electronic device; and
   obtain at least a portion of the information based at least in part on the other keyword.

17. The apparatus of claim 16, wherein the controller is configured to:
   filter a search result obtained based on the keyword using the other keyword.

18. A method comprising:
   receiving, at an electronic device, a keyword and a specified period from an external device external to the electronic device, the keyword and the specified period to be used for a push service of the electronic device;
   determining whether the keyword satisfies a specified condition during the specified period; and
   transmitting information associated with the keyword to the external device based on the determining.

19. The method of claim 18, wherein the determining comprises:
   determining that the keyword satisfies the specified condition when the keyword is searched by another device during the specified period.

20. The method of claim 18, further comprising:
   identifying one or more sources using source information received from the external device; and
   obtaining at least a portion of the information from the one or more sources.

* * * * *

UNITED STATES PATENT AND TRADEMARK OFFICE
CERTIFICATE OF CORRECTION

Page 1 of 1

PATENT NO.           : 9,245,031 B2
APPLICATION NO.      : 14/509324
DATED                : January 26, 2016
INVENTOR(S)          : Min-Ji Kim et al.

It is certified that error appears in the above-identified patent and that said Letters Patent is hereby corrected as shown below:

Claims

Column 8, Claim 6, Line 39 should read as follows:
--...from a user...--

Signed and Sealed this
Twenty-sixth Day of April, 2016

Michelle K. Lee
*Director of the United States Patent and Trademark Office*